(12) United States Patent
Sedlmayr

(10) Patent No.: US 11,065,766 B2
(45) Date of Patent: Jul. 20, 2021

(54) METHOD AND COMPUTER PROGRAM FOR CORRECTING ERRORS IN A MANIPULATOR SYSTEM

(71) Applicant: KUKA Deutschland GmbH, Augsburg (DE)

(72) Inventor: Andreas Sedlmayr, Fürstenfeldbruck (DE)

(73) Assignee: KUKA Deutschland GmbH, Augsburg (DE)

( * ) Notice: Subject to any disclaimer, the term of this patent is extended or adjusted under 35 U.S.C. 154(b) by 488 days.

(21) Appl. No.: 15/775,619

(22) PCT Filed: Nov. 9, 2016

(86) PCT No.: PCT/EP2016/001859
§ 371 (c)(1),
(2) Date: May 11, 2018

(87) PCT Pub. No.: WO2017/080650
PCT Pub. Date: May 18, 2017

(65) Prior Publication Data
US 2018/0345497 A1    Dec. 6, 2018

(30) Foreign Application Priority Data

Nov. 11, 2015 (DE) .......................... 102015222168.7

(51) Int. Cl.
*G05B 19/04* (2006.01)
*G05B 19/18* (2006.01)
(Continued)

(52) U.S. Cl.
CPC .......... *B25J 9/1674* (2013.01); *B25J 9/1653* (2013.01); *G05B 19/0428* (2013.01);
(Continued)

(58) Field of Classification Search
CPC ... B25J 9/1653; B25J 9/1674; G05B 19/0428; G05B 19/4067; G05B 2219/13001;
(Continued)

(56) References Cited

U.S. PATENT DOCUMENTS 4,570,217 A    2/1986 Allen et al.
5,170,034 A *  12/1992 Seshimo ............ G05B 19/4067
                                              219/125.1
(Continued)

FOREIGN PATENT DOCUMENTS

CN    101027647 A    8/2007
CN    103372863 A    10/2013
(Continued)

OTHER PUBLICATIONS

U.S. Office Action dated Feb. 4, 2020 for U.S. Appl. No. 15/775,614.
(Continued)

*Primary Examiner* — Harry Y Oh
(74) *Attorney, Agent, or Firm* — Bachman & LaPointe, P.C.

(57) ABSTRACT

The invention relates to a method for correcting errors in a manipulator system, wherein the manipulator system comprises at least one manipulator and is controlled by means of at least one manipulator program, wherein the method comprises the following method steps: •providing at least one manipulator program, wherein the manipulator program comprises several operations; •combining at least two of the operations to form at least one operation structure; •defining at least one placement point (AP1, AP2), wherein the at least one placement point (AP1, AP2) forms the start andor the end of an operation structure (310); •providing at least one reaction structure (320) and assigning the reaction structure (320) to an operation structure (310), wherein tlte at least one reaction structure (320) contains reaction operations (R1

(Continued)

to Rn), upon the execution of which, the manipulator program controls the manipulator system such that it is passed into a system state which corresponds to a placement point (AP1, AP2); •executing the manipulator program and, if an error occurs, •executing the reaction structure (320) such that the manipulator system is transferred into a system stare which corresponds to a placement point (AP1, AP2).

18 Claims, 5 Drawing Sheets

(51) Int. Cl.
  *B25J 9/16* (2006.01)
  *G05B 19/4067* (2006.01)
  *G05B 23/02* (2006.01)
  *G05B 19/042* (2006.01)

(52) U.S. Cl.
  CPC ..... *G05B 19/4067* (2013.01); *G05B 23/0286* (2013.01); *G05B 2219/13001* (2013.01); *G05B 2219/25416* (2013.01); *G05B 2219/39024* (2013.01); *G05B 2219/50103* (2013.01)

(58) Field of Classification Search
  CPC ........... G05B 2219/25416; G05B 2219/39024; G05B 2219/50103; G05B 23/0286
  See application file for complete search history.

(56) References Cited

U.S. PATENT DOCUMENTS

| | | | |
|---|---|---|---|
| 5,495,409 A * | 2/1996 | Kanno | G05B 19/0426 700/79 |
| 6,108,662 A | 8/2000 | Hoskins et al. | |
| 6,157,864 A | 12/2000 | Schwenke et al. | |
| 6,167,328 A | 12/2000 | Takaoka et al. | |
| 6,289,264 B1 | 9/2001 | Zenke | |
| 6,360,143 B1 | 3/2002 | Yanagita | |
| 9,262,129 B2 | 2/2016 | Santori et al. | |
| 9,999,973 B2 * | 6/2018 | Finkemeyer | G05B 19/045 |
| 10,504,231 B2 | 12/2019 | Fiala | |
| 2002/0144015 A1 * | 10/2002 | Lortz | G05B 19/045 719/318 |
| 2007/0282480 A1 * | 12/2007 | Pannese | G05B 19/41885 700/213 |
| 2008/0201618 A1 | 8/2008 | Pfeiffer et al. | |
| 2008/0208372 A1 * | 8/2008 | Pannese | G05B 13/027 700/48 |
| 2009/0198378 A1 | 8/2009 | Boerner et al. | |
| 2011/0288667 A1 * | 11/2011 | Noda | G05B 19/42 700/98 |
| 2012/0265338 A1 * | 10/2012 | Keibel | B25J 9/1674 700/245 |
| 2013/0282177 A1 | 10/2013 | Wiedemann et al. | |
| 2015/0266182 A1 * | 9/2015 | Strandberg | B25J 9/1666 700/255 |

FOREIGN PATENT DOCUMENTS

| | | |
|---|---|---|
| CN | 104812535 A | 7/2015 |
| CN | 104968194 A | 10/2015 |
| CN | 104972463 A | 10/2015 |
| DE | 102004046611 A1 | 3/2006 |
| EP | 0606649 A2 | 7/1994 |
| EP | 1510894 A1 | 3/2005 |
| EP | 1533671 A1 | 5/2005 |
| EP | 1724676 A1 | 11/2006 |
| EP | 2085846 A2 | 8/2009 |
| EP | 2656980 A2 | 10/2013 |
| WO | 2011125280 A1 | 10/2011 |
| WO | 2017080647 A1 | 5/2017 |
| WO | 2017080648 A1 | 5/2017 |

OTHER PUBLICATIONS

International Preliminary Report on Patentability dated May 15, 2018 for PCT Patent Application No. PCT/EP2016/001857.
International Preliminary Report on Patentability dated May 15, 2018 for PCT Patent Application No. PCT/EP2016/001859.
International Preliminary Report on Patentability dated May 15, 2018 for PCT Patent Application No. PCT/EP2016/001856.
International Search Report dated Jan. 31, 2017 for PCT Patent Application No. PCT/EP2016/001856.
International Search Report dated Feb. 17, 2017 for PCT Patent Application No. PCT/EP2016/001857.
International Search Report dated Feb. 17, 2017 for PCT Patent Application No. PCT/EP2016/001859.
Cosirop 2.0 Programming Software for Mitsubishi Industrial Robots, Dec. 31, 2003, Institute of Robotics Research, Dortmund, Germany.
Office Action dated Oct. 12, 2020 for Chinese Patent Application No. 201680066068.7.

* cited by examiner

METHOD AND COMPUTER PROGRAM FOR CORRECTING ERRORS IN A MANIPULATOR SYSTEM

FIELD OF THE INVENTION

Invention relates to a method and a computer program for correcting errors in a manipulator system. Such manipulator systems typically comprise at least one manipulator and are controlled by means of a manipulator program. If an error occurs in the manipulator system, then the manipulator system can be converted into a system state that allows the manipulator program to be continued.

BACKGROUND

Typical manipulator systems typically comprise at least one manipulator which is configured to interface physically with its environment. By way of example, such a manipulator may be an industrial robot which has at least three movable, freely programmable axes and guides an end effector, such as a gripper or a processing tool, for example. Such manipulator systems are used in automobile manufacture, for example.

Manipulator systems are typically controlled by means of a manipulator program which predefines the system behavior in an application-specific manner. The requirements made of the programming of manipulator programs have changed for example owing to the use of new sensor systems that open up new task areas in robotics. By way of example, new functionalities can be programmed through the use of force and/or moment sensors, such as are used for example in the industrial robot LBR iiwa from KUKA AG. Said functionalities encompass, inter alia, search passes with sensor systems, force-regulated tool operation, HRC (Human-Robot Cooperation) capabilities and sensitive gripping.

Manipulators implement these functions by means of programmed operations. To that end, a manipulator program typically comprises a plurality of operations. The juxtaposition of a plurality of operations forms a process. During the execution of a process, an error may occur that prevents continuation as planned. The reason for the occurrence of an error may be for example a programming error (e.g. as a result of incorrectly set parameter values) or the occurrence of an unforeseen event in response to which the manipulator system cannot react independently or demands an interruption of the planned process.

If an error occurs, in principle there is the possibility of continuing with a new, changed plan or of reversing the process. Some processes can be completely reversed and repeated. Other processes are irreversible processes and cannot be reversed; however, with knowledge of the type of error, the process that was begun and terminated can be "repaired". Nevertheless, it is often necessary to terminate the manipulator program and start it anew, as a result of which high restart times and costs are generated.

One example of an irreversible process is welding by means of a manipulator. If the welding process is interrupted, then the process cannot simply be repeated since the seam already welded could be damaged by the renewed (over-) welding. However, the elimination of an error that occurred, the process could be continued from the point of interruption.

Consequently, methods are required which enable (automated) continuation of processes begun, repetition and/or a change of plan in the process. If such methods are intended to be achieved with conventional programming techniques, the complexity is additionally increased, as a result of which the number of programming errors rises.

Nowadays manipulator programs are usually programmed using domain-specific programming languages based e.g. on BASIC or PASCAL. These programming languages are usually executed by an interpreter. A great proportion of programming is debugging and process or parameter optimization, which is effected at the end of the programming of the regular process (i.e. of the manipulator program). Error detection and correction require considerable resources in terms of time and personnel, thus giving rise to high costs. Furthermore, there is the threat of extensive damage if an error that has not been detected leads, e.g. to an interruption of series production.

Moreover, manipulator programs can be programmed with the aid of a general high-level language (e.g. Java). The program code is typically compiled and executed by a byte code interpreter (Java VM) of the programming language. However, the real-time capability of this type of interpreter is limited, and so the system time of the manipulator program and that of the manipulator system can deviate from one another. Consequently, it is not possible to react to runtime errors in real time. Furthermore, e.g. Java VM is typically not equipped for the particular requirements of the manipulator programming. In particular, inter alia, the execution of the manipulator program starting from a specific location in the sequence of the manipulator program (program entry), jumping to a specific location in the sequence of the manipulator program during the execution of the manipulator program, and stopping and continuing at a defined location in the sequence of the manipulator program are not supported. The rectification of errors is made more difficult as a result.

In order to reduce the probability of errors, automobile manufacturers and system integrators have developed guidelines (so-called coding standards, e.g. "VW standard", "Daimler standard", etc.) on the basis of the specific (manipulator) programming language. By way of example, such guidelines stipulate that an error handling/reaction be systematically provided for typical application errors. The manner in which program code ought to be written is thus stipulated to the programmer.

After rectification of the error, such error handlings or error reactions are intended to allow the manipulator program to be continued as planned. Command structures used for this purpose, such as "GOTO" commands, "IF-ELSE" commands or other jump and branch commands, are not very clear, however, which leads to an increase in the complexity of the manipulator programs. Furthermore, in the conventional error handling it must often be assumed that every operation of the manipulator program that has been carried out must be reset individually and in the correct order. This is not possible in an automated manner by means of conventional interpreters, such as Java VM. Irreversible processes, in particular, are not suitable for an automated cancellation of the individual operations.

It is an object of the present invention to provide a method and a computer program and also a device which can at least partly eliminate the disadvantages described.

SUMMARY

The object of the invention is achieved by means of a method for correcting errors in a manipulator system as claimed in claim 1, a computer program as claimed in claim 14 and a device as claimed in claim 16.

In particular, the object is achieved by means of a method for correcting errors in a manipulator system, wherein the manipulator system comprises at least one manipulator and is controlled by means of at least one manipulator program, and wherein the method comprises the following method steps:

provides at least one manipulator program, wherein the manipulator program comprises a plurality of operations;

combining at least two of the operations to form at least one operation structure;

defining at least one rerun point, wherein the at least one rerun point forms the beginning and/or the end of an operation structure;

providing at least one reaction structure and assigning the reaction structure to an operation structure, wherein the at least one reaction structure includes reaction operations, upon the execution of which the manipulator program controls the manipulator system such that the latter is guided into a system state corresponding to a rerun point;

executing the manipulator program and, if an error occurs, executing the reaction structure, such that the manipulator system is converted into a system state corresponding to a rerun point.

Manipulator programs serve for controlling the manipulator system. By way of example, a manipulator program can predefine movements and work steps of a manipulator of the manipulator system. In this regard, it is possible, for example, for a manipulator to be moved in accordance with a defined movement path in order to grip an object. After it, the object can be moved in accordance with a second defined movement path and be deposited at a different position. Manipulator programs can likewise comprise instructions relating to the mounting of pots, welding, rivet placement or other tasks.

To that end, the manipulator program has a plurality of operations, wherein a plurality of operations are juxtaposed to form a process in order to control the manipulator system and to perform the abovementioned tasks, for example. In this case, at least two of the operations are combined to form an operation structure. Associated operations such as, for instance, mutually independent operations or functionally correlated operations are typically combined to form an operation structure. The manipulator program can thus be made clearer and managed better.

If a plurality of operation structures are executed in succession, then the preceding operation structure in each case is concluded. However, an individual first operation can start a second operation that extends beyond the execution time of the first operation. In this case, the context of the operation structure must be maintained until the last operation of the operation structure has been completely executed. The operation structures thus do not mutually influence one another. Consequently, operation structures executed in parallel lead to the same results as operation structures executed in series. Furthermore, a change in state of an implemented operation structure is permanent.

As described above, the beginning and/or the end of an operation structure can form a rerun point. Proceeding from a rerun point, the manipulator program can be continued independently of its execution history. The same results are always achieved in this case.

Preferably, an operation structure is assigned at least one reaction structure, wherein the at least one reaction structure includes reaction operations upon the execution of which the manipulator program controls the manipulator system such that the latter is guided into a system state corresponding to a rerun point.

If an error then occurs which is based on a programming error or stems from an unforeseen event, such a rerun point can be reached by means of a reaction structure and the manipulator program can be continued from said rerun point. In this case, the rerun point need not correspond to the last rerun point that was passed through. Likewise, a different operation structure than the one in which the error occurred can also be executed by a rerun point. Consequently, a process that has begun can be corrected or continued with a new plan without the manipulator program having to be terminated or restarted.

Furthermore, the direct assignment of operation structure and reaction structure makes possible a clear manipulator program, as a result of which errors in the programming can be reduced. Furthermore, debugging is simplified.

Preferably, an operation structure is consistent, such that the integrity conditions of the manipulator system are complied with at a rerun point and/or before and/or after the execution of the operation structure. This ensures that a manipulator program can be continued on a rerun point independently of its execution history. The same results are always achieved in this case.

If an error occurs during the execution of the manipulator program, said error being caused for example by a programming error or by an unforeseen event in the manipulator system, then a reaction structure can be executed which converts the manipulator system into the system state corresponding to a rerun point. In this case, not only is the software "rewound", but the manipulator system is actually converted into a system state corresponding to the rerun point.

The reaction structure preferably comprises reaction operations which can reverse individual operations if the relevant operation structure describes a reversible process. If the relevant operation structure describes an irreversible process, then the reaction structure can contain reaction operations which enable continuation with a changed plan, i.e. which deviate from a product cancellation of executed operations.

By way of example, during the placement of a rivet by means of a manipulator, the rivet can become stuck in a hole. Correct riveting is not possible in this case. If the manipulator system detects this error, then the operation structure "riveting" can be terminated and an assigned reaction structure can be initiated. In this example, a possible reaction structure could comprise opening the riveting tool. Afterward, withdrawal of the stuck rivet from the hole could be commanded. Finally, a new rivet could be picked up, and the operation structure "riveting" could be carried out anew.

Further reaction structures are likewise possible. By way of example, depending on the number of failed attempts to execute an operation structure, a reaction structure can command a different procedure. Staying with the previous example, after the repeated iteration of the operation structure "riveting", leading to the same error "stuck rivet", a different procedure could be commanded and an operator could be called. Said operator could be asked to remove the stuck rivet manually.

An operation structure and an assigned reaction structure are preferably implemented in a common semantic module. A fixed assignment of operation structure and reaction structure is thus ensured in the manipulator program, whereby the complexity is reduced.

Besides reversing an operation structure, a reaction structure can also command the termination of the operation structure and/or the continuation of the manipulator program from a different rerun point. Preferably, the system state of the manipulator system at a rerun point and/or before and/or after the execution of an operation structure is not consistent in all system parameters. However, it is necessary to provide consistency in the essential parameters, such that it is possible to continue or repeat the manipulator program proceeding from said rerun point.

Inconsistent system parameters of this type can originate from irreversible processes, for example. By way of example, if a welding process is controlled by means of the manipulator program, then the parameter "weld seam length" is irreversible since, for example, the specific part of the weld seam has already been welded by the time that the error occurs. If an error then occurs, the reaction structure cannot establish the same system state as before the implementation of the welding process. Therefore, in this case, the reaction structure must provide a corresponding reaction operation which makes it possible rectify the causative error of the welding process (e.g. cleaning of the welding tool) and then continue at the location of the weld seam at which the welding was interrupted. It is likewise possible for the reaction structure in this case to provide an alternative procedure according to which the interrupted weld seam is not intended to be welded to completion, but rather is intended to be reworked in a manual work step. In this case the manipulator program can be continued at a different location.

Preferably, the execution of an operation structure is interrupted upon the occurrence of an error and the execution of a reaction structure is continued afterward. Consequently, an operation structure of the manipulator program can be repeatedly directly after the occurrence of an error or the manipulator program can be continued for a different rerun point. This makes it possible to minimize stoppage times of the manipulator system and to continue preferably in an automated manner, i.e. without intervention by an operator. The productivity of the manipulator system can thus be increased.

Particularly preferably, not every operation of an operation structure is assigned a dedicated reaction operation of a corresponding reaction structure. Likewise, not every operation structure need be assigned a dedicated reaction structure. Preferably, one reaction structure is assigned to one operation structure, wherein the reaction structure is preferably assigned to at least one further operation structure. It is thus possible to react to errors of different operation structures with a reduced number of reaction structures. One reaction structure is preferably assigned to a plurality of operation structures if the operation structures have a common rerun point.

Preferably, the reaction structure includes at least one reaction operation whose execution guides the manipulator system into a system state corresponding to the rerun point, which rerun point forms the beginning of the operation structure in which the error occurred. Such reaction structures make it possible to "rewind" the manipulator system. The operation structure in which the error occurred can thus be repeated. In this case, return to the rerun point need not correspond to a direct inversion of the operation structure, but rather can be executed on an alternative route (path). By way of example, if a movement of a manipulator is intended to be reversed and if the direct return route is blocked, then the manipulator can be returned to the starting point of the movement on an alternative movement path.

Preferably, the at least one reaction operation reverses an operation of the operation structure. Consequently, individual operations can be directly reversed. This is advantageous particularly in the case of reversible processes. In this regard, by way of example, a movement carried out by the manipulator can be directly reversed.

Preferably, an operation of the manipulator program is defined by at least one parameter, wherein the at least one parameter is variable by a reaction operation of the reaction structure. Preferably, the parameter can be adapted by means of the graphical user interface.

A parameter can be a numerical parameter, such as a manipulator speed, for example, or an instruction parameter that influences the sequence of the operations of an operation structure or the selection of the subsequent operation structure. A reaction operation can thus have the effect that the operation structure is continued with altered parameters (e.g. with a slower manipulator speed) or is repeated with altered parameters. It is likewise possible to achieve an alternative branching of the manipulator program.

Preferably, the reaction structure includes at least one reaction operation whose execution continues the interrupted operation structure with at least one changed parameter or executes the interrupted operation structure anew, It is thus possible for operation structures in which an error occurred to be executed anew or, if necessary, with changed, preferably optimized, parameters.

Preferably, the reaction structure includes at least one reaction operation whose execution interrupts the interrupted operation structure until an operator input has been effected, preferably by means of the graphical user interface.

This makes it possible, if the error that occurred cannot automatically be rectified by the manipulator system, to request the intervention of an operator. By way of example, the operator can be asked to check a specific system state, to remove or exchange faulty parts or workpieces from the manipulator system, and/or the like. Once the operator confirms to the manipulator system that the task has been performed successively, then it is possible to continue with the reaction structure or an operation structure.

Preferably, different reaction operations of the reaction structure are executed, depending on the type of error that has occurred. This is advantageous since it is thus possible to react individually to different types of error. Preferably, different reaction structures are executed depending on the error that has occurred. To that end, an operation structure is preferably assigned a plurality of reaction structures that are executed depending on the error that has occurred.

By way of example, if an operation structure is terminated since a safety mechanism of the manipulator system intervenes, then the operation structure may possibly simply be repeated if the reason for the intervention by the safety facility was a temporary reason. On the other hand, if an error occurs which cannot be rectified in an automated manner, an operator can be called in, who can preferably carry out inputs by means of the graphical user interface in order to rectify an error that has occurred. By way of example, it is possible that an error requires continuation at a different rerun point of the manipulator program. By way of example, a control device can be skipped and the computer program can be continued at a different location (in this respect, see the above example, according to which an interrupted weld seam is not intended to be completed). Consequently, an erroneously executed operation of an operation structure and/or an erroneously executed operation structure can be followed by a corresponding reaction structure of the manipulator program. This enables errordependent, differentiated debugging and continuation of the manipulator program from a suitable rerun point. Furthermore, parameters can be changed differently preferably depending on the error that has occurred. By way of example, it is possible to carry out repetition of an operation structure with reduced speed of the manipulator if a first error occurs, or with an altered force threshold of force monitoring of the manipulator if a second error occurs. Other altered parameters are likewise conceivable.

Preferably, the at least one operation structure is linked with at least one further operation and/or operation structure at a rerun point and one of the linked operations and/or operation structures is executed after the rerun point has been reached. In this case, the rerun point can be reached via an operation structure (i.e. forward) or via a reaction structure (i.e. backward). A link of a plurality of operation structures with a rerun point makes it possible to implement different program sequences by means of the branching or the manipulator program. Consequently, after reaching a rerun point it is possible to continue with different operation structures/operations. This enables flexible error correction. Likewise, an operation structure can preferably be executed with changed parameters, depending on the error that occurred.

Preferably, a parameter is a numerical parameter or an instruction parameter. Numerical parameters are parameters which are expressed in numerical values and correspond to physical variables. The latter are for example speeds of the manipulator, force thresholds, moment thresholds, wait times and the like. Instruction parameters influence the sequence of the manipulator program and predefine for example the execution order of the operation structures or of individual operations.

Preferably, the manipulator program includes real-time operations and real-time reaction operations and also non-real-time operations and non-real-time reaction operations, and wherein all real-time reaction operations and non-real-time reaction operations are ended before the execution of a real-time operation. By determining non-real-time and real-time operations and/or reaction operations, it is possible to achieve a deterministic behavior of the manipulator program. If the intention is to carry out a real-time operation and/or reaction operation, then it is ensured that the time of the manipulator program and the actual system time correspond.

By contrast, if non-real-time operations are executed, then the time of the manipulator program and the actual system time can deviate from one another. By way of example, non-real-time operations and/or reaction operations can thus run in the background.

The object is furthermore achieved by means of a computer program having program commands which, when they are loaded on a computer and/or microcontroller, cause the computer and/or microcontroller to execute the method described. Such computer programs can be loaded on devices configured to control manipulator systems. Preferably, an operation structure and an assigned reaction structure are implemented in the same manipulator program part and preferably form a semantic module. As a result, the operation structures or reaction structures are closely linked with one another, such that the programming can be made clear. Furthermore, the computer program is preferably implemented as part of the manipulator program. Likewise, the computer program can be a standalone computer program.

The object is furthermore achieved by means of a device configured to execute the computer program. Such devices are for example control devices of the manipulator system.

BRIEF DESCRIPTION OF THE DRAWINGS

The invention is described in detail below with reference to FIGS. 1 to 5, in which.

DETAILED DESCRIPTION

Figure 1:
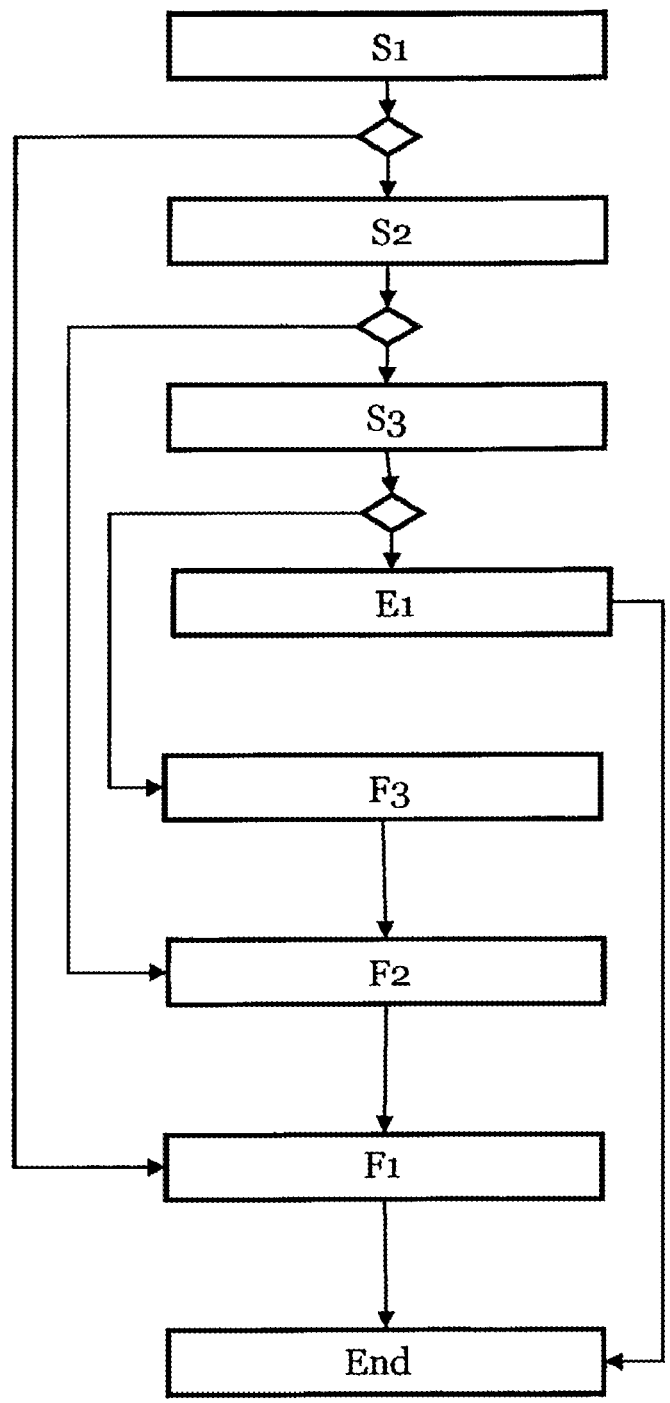
FIG. 1 shows a method for debugging in accordance with the prior art.

In particular, FIG. 1 shows a schematic illustration of error handling of a manipulator program 1 in accordance with a known method. After the execution of a process step S1, S2, S3, a check is made to determine whether the respective process step has been carried out successfully. If this is the case, it is possible to continue with the following process step S2. If an error occurs, then the manipulator program jumps to an error handling structure F1, F2, F3, which ends the manipulator program. After the rectification of the error, the manipulator program has to be started anew. This error handling is inflexible and is therefore suitable for manipulator systems only to a limited extent. If complicated error situations are also intended to be covered by conventional methods, then the complexity of the manipulator program rises and thus so does the error probability for possible programming errors.

Figure 2:
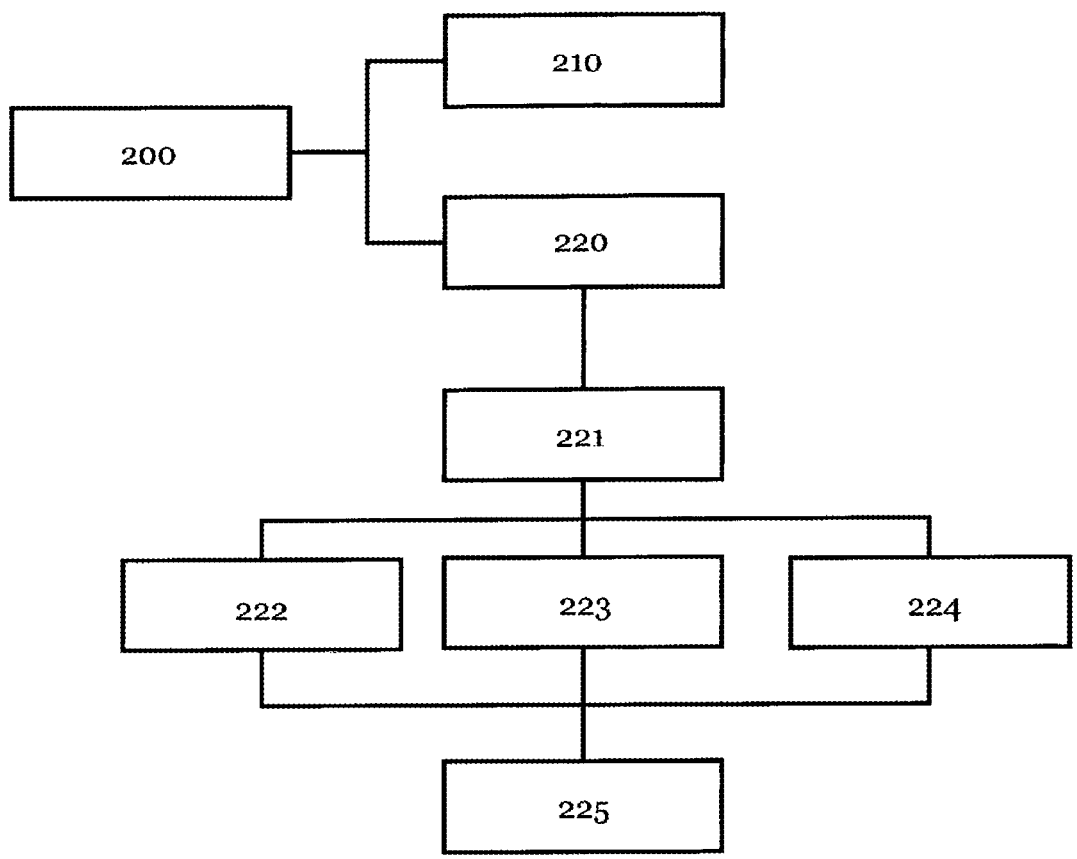
FIG. 2 shows a schematic illustration of a semantic module of an operation structure and of a reaction structure.

FIG. 2 shows a schematic illustration 2 of a semantic module of a computer program for carrying out a method for correcting errors in a manipulator system. In this case, the semantic module 200 is subdivided into an operation structure 210 and into a reaction structure 220. If an error occurs during the execution of the operation structure 210, then the operation structure 210 is interrupted and the process continues with the reaction structure 220.

The reaction structure 220 includes reaction operations 221 to 225. In a first reaction operation 221, the type of error that occurred is determined and a decision is made regarding with which of the reaction operations 222-224 the process is intended to continue. By way of example, reaction operation 222 can comprise instructions that command a continuation of the operation structure 210 with a changed parameter set. reaction operation 223 can comprise for example instructions that at least partly reverse the operations of the executed and interrupted operation structure 210. reaction operation 224 can comprise a termination instruction, such that the process does not continue with operation structure 210, but rather with a further operation structure.

The reaction operation 225 comprises an instruction that defines the rerun point and the following operation structure with which the manipulator program is intended to be continued. Such a rerun point can be defined for example at the beginning of the operation structure 210, such that the operation structure 210 can be executed anew. The renewed execution of the operation structure 210 can be effected, if appropriate, with a changed parameter set. Likewise, other rerun points can also be used for continuing the manipulator program. A branching and diverse reactions to errors are thus possible. Since both the operation structure and the reaction structure are implemented in the same semantic module, the manipulator program remains clear and allows an individual adaptation of the operation structure and/or of the reaction structure. Programming errors can thus be rectified rapidly and the probability of programming errors arising is reduced on account of the reduced complexity and increased polarity.

Figure 3:
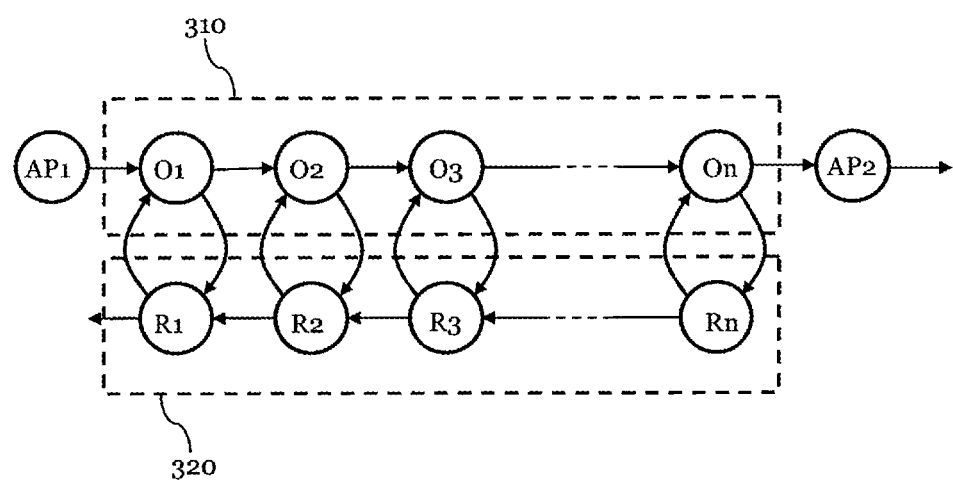
FIG. 3 shows a schematic illustration of an operation structure and of a reaction structure of the manipulator program.

FIG. 3 shows a schematic illustration of an operation structure 310 and of a reaction structure 320. The operation structure 310 comprises a plurality of operations O1 to On. Said operations are preferably executed sequentially, as indicated by the straight arrows depicted in a continuous fashion. The operation structure 310 begins at a first rerun point AP1 and ends at a second rerun point AP2. The manipulator system is preferably consistent at the rerun points. Consequently, the operation structure can be executed from a rerun point independently of the previous execution history and yields the same results.

The operation structure 310 is assigned a reaction structure 320 comprising a plurality of reaction operations R1 to Rn. In the case illustrated, if an error occurs in an operation O1 to On. firstly the relevant operation O1 to On is revered by means of the corresponding reaction operation R1 to Rn. If this is successful, a decision can be made as to whether the operation O1 to On in which the error occurred is intended to be executed anew, or whether further past operations O1 to On are intended to be reversed by means of further reaction operations R1 to Rn. The invention is not restricted to the embodiment shown herein. In particular, it is also possible for a plurality of operations to be reversed by a reaction structure, or it is also possible to take a different path than actually "reversing" an operation to a previous rerun point.

Figure 4:
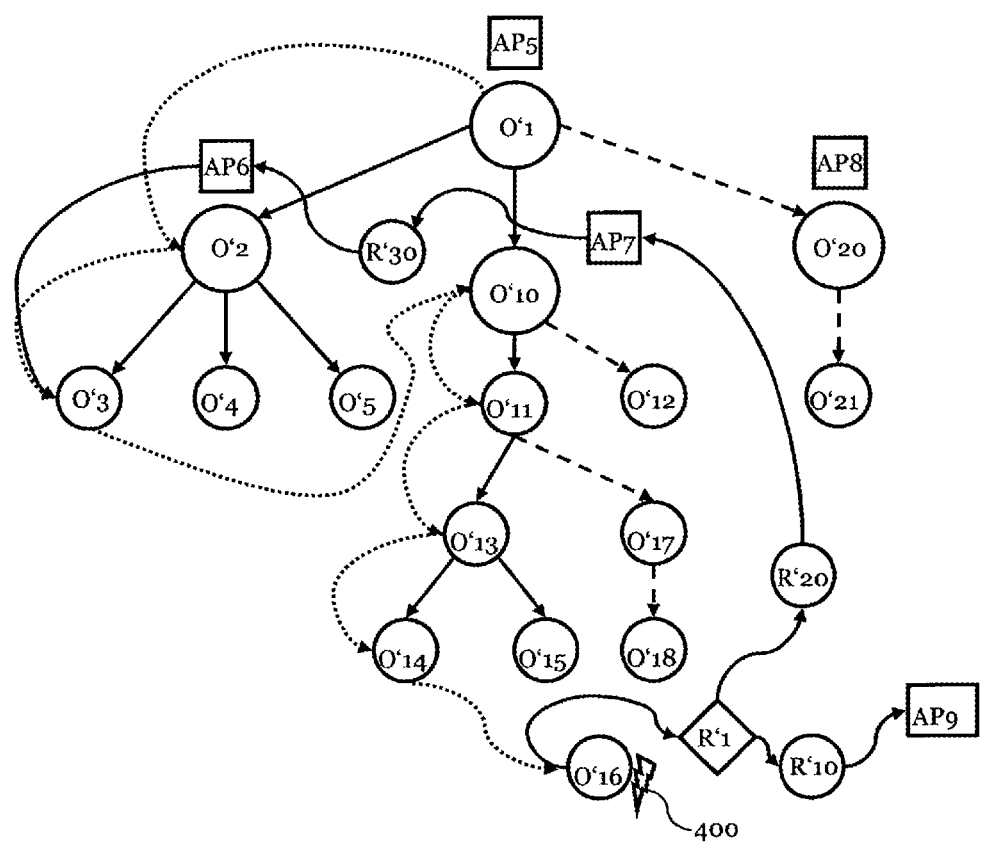
FIG. 4 shows a schematic illustration of a model of a manipulator program.

FIG. 4 shows a schematic model 4 of a manipulator program, comprising a plurality of operations O'1 to O'21 and a plurality of reaction operations R'1 to R'30. Beginning at rerun point AP5, the operation O'1 can be executed. The envisaged program sequence is illustrated by dotted arrows. The manipulator program subsequently executes the operation O'2. Here there is the possibility of branching to one of the operations O'3-O'5. In the example shown, the program sequence leads to operation structure O'3. The process subsequently continues with operation structure O'10, to which the rerun point AP7 is assigned. In the following operation structure, the operations O'11, O'13, O'14 and O'16 are executed successively, wherein an error 400 occurs during the execution of the operation O'16. The erroneous operation O'16 is terminated and the process continues with the reaction operation R'1.

The reaction operation R'1 provides two possible procedures. The first leads to reaction operation R'10 and the second leads to reaction operation R'20, which leads to rerun point AP7. From rerun point AP7, the process can continue with operation O'10 or return via the reaction operation R'30 to operating point AP6, which is assigned to the operation O'2. Consequently, it is possible for different operations to be reversed by means of different reaction operations or, if processes are irreversible, it is also possible to choose different paths through the manipulator program. A path denotes the sequence of operations and/or reaction operations.

Figure 5:
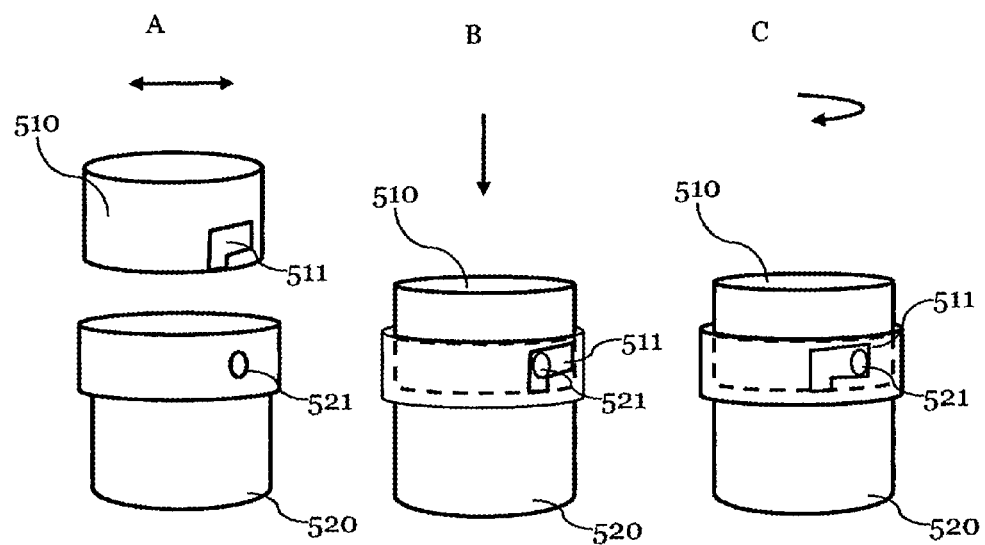
FIG. 5 shows a schematic illustration of an application of the manipulator program.

FIG. 5 shows one exemplary example of an application of the method. In accordance with the application, in illustration A, a first part 510 having a bayonet catch 511 is aligned above a second part 520. The second part 520 comprises a projection 521, which can latch with the bayonet catch 511. In order to assemble the two parts 510, 520, firstly a manipulator has to align the first part 510 concentrically relative to the second part 520. Once this has been done, the first part 510 can be lowered (see illustration B), such that the projection 521 is introduced into the bayonet catch 511 of the part 510. Afterward, the first part 510 is rotated by means of the manipulator (illustration C), such that the bayonet catch 511 latches with the projection 521. If an error then occur for example during the lowering of the first part 510, by means of a reaction structure the manipulator program can be induced to begin the alignment of the two parts 510, 520 anew. If this fails, i.e. if the error cannot be rectified automatically, an operator can be called in, who for example positions the first part 510 correctly with respect to the second part 520 or removes the first part 510. Consequently, the assembly process can be continued and an error that occurs can be rectified, without the manipulator program having to be terminated and started anew.

LIST OF REFERENCE SIGNS

AP1-AP9 Rerun points
E1 Ending step
F1 to F3 Error structures
O1 to On Operations
O'1 to O'21 Operations
R1 to Rn Reaction operations
R'1 to R'30 Reaction operations
S1 to S3 Execution steps
200 Semantic module
210; 310 Operation structure
220; 320 Reaction structure
221, 222, 223, 224, 225 Reaction operations
400 Error
610 First part
620 Second part
611 Bayonet catch
621 Projection

What is claimed is:
1. A method for correcting errors in a manipulator system, wherein the manipulator system comprises at least one manipulator and is controlled by means of at least one manipulator program, and wherein the method comprises:
   providing at least one manipulator program, wherein the manipulator program comprises a plurality of operations;
   combining at least two of the operations of the plurality of operations to form at least one operation structure;
   defining at least one rerun point wherein the at least one rerun point forms the beginning and/or the end of an associated operation structure of said at least one operation structure;
   for the at least one rerun point, providing at least one reaction structure and assigning the at least one reaction structure to the associated operation structure, wherein the at least one reaction structure includes reaction operations, upon the execution of which the manipulator program controls the manipulator system such that the manipulator system is guided into a system state corresponding to said rerun point;
   executing the manipulator program;
   when a first type of error occurs at a given point, executing a reaction structure of the at least one reaction structure, such that the manipulator system is converted into a system state corresponding to the rerun point for which said executed reaction structure was provided; and when a second type of error, different from the first type or error, occurs at the same given point, executing different reaction operations of said executed reaction structure.

2. The method as claimed in claim 1, wherein each of the at least one operation structure is consistent, such that, at the associated rerun point and/or before and/or after the execution of the operation structure, the integrity conditions of the manipulator system are complied with.

3. The method as claimed in claim 1, wherein the system state of the manipulator system at a rerun point of the at least one rerun point and/or before and/or after the execution of an operation structure of the at least one operation structure is not consistent in all system parameters.

4. The method as claimed in claim 1, wherein the execution of an operation structure of the at least one operation structure is interrupted upon the occurrence of an error, and the method subsequently continues with the execution of the associated reaction structure.

5. The method as claimed in claim 1, wherein the at least one reaction structure includes at least one said reaction operation the execution of which guides the manipulator system into the system state corresponding to the rerun point which rerun point forms the beginning of the operation structure in which the error occurred.

6. The method as claimed in claim 1, wherein execution of the at least one reaction operation of the at least one reaction structure interrupts an interrupted operation structure of the at least one operation structure until a user input has been effected.

7. The method as claimed in claim 1, wherein an operation of the manipulator program is defined by at least one parameter, and wherein the at least one parameter is variable by the reaction operation of the reaction structure.

8. The method as claimed in claim 1, wherein the reaction structure includes at least one said reaction operation the execution of which continues an interrupted operation structure of the at least one operation structure with at least one changed parameter or executes the interrupted operation structure anew.

9. The method as claimed in claim 6, wherein at least one reaction operation of the reaction operations reverses an operation of the associated operation structure.

10. The method as claimed in claim 1, wherein a first operation of the at least one operation structure is linked with at least one further operation of the plurality of operations and/or operation structure of the at least one operation structure at a first rerun point of the at least one rerun point and one of the linked least one further operation and/or operation structure is executed after the first rerun point has been reached.

11. The method as claimed in claim 10, wherein a parameter is a numerical parameter or an instruction parameter.

12. The method as claimed in claim 1, wherein the manipulator program includes real-time operations and real-time reaction operations and also non-real-time operations and non-real-time reaction operations, and wherein all real-time reaction operations and non-real-time reaction operations are ended before the execution of a real-time operation.

13. A computer and/or microcontroller running a program having program commands which, when they are loaded on the computer and/or microcontroller, cause the computer and/or microcontroller to execute the method as claimed in claim 1.

14. The computer and/or microcontroller as claimed in claim 13, wherein the at least one operation structure and the associated reaction structure are implemented in the same manipulator program part and form a semantic module.

15. A method for correcting errors in a manipulator system, wherein the manipulator system comprises at least one manipulator and is controlled by means of at least one manipulator program, and wherein the method comprises the following method steps:

providing at least one manipulator program, wherein the manipulator program comprises a plurality of operations;

combining at least two of the operations to form at least one operation structure;

predefining at least one rerun point, wherein the at least one rerun point forms the beginning and/or the end of an associated said operation structure;

for the at least one rerun point, providing at least one reaction structure and preassigning the reaction structure to the associated operation structure, wherein the at least one reaction structure includes reaction operations, upon the execution of which the manipulator program controls the manipulator system such that the manipulator system is guided into a system state corresponding to said rerun point;

executing the manipulator program and, when a first type of error occurs at a given point:

executing the reaction structure, such that the manipulator system is converted into a system state corresponding to the rerun point for which said reaction structure was provided; and when a second type of error, different from the first type or error, occurs at the same given point:

executing different reaction operations of said executed reaction structure.

16. The method as claimed in claim 15, wherein the at least one reaction structure includes at least one said reaction operation the execution of which guides the manipulator system into the system state corresponding to the rerun point which rerun point forms the beginning of the operation structure in which the error occurred.

17. The method as claimed in claim 15, wherein execution of the reaction structure reaction operation the execution of which continues an interrupted operation structure of the at least one operation structure with at least one changed parameter or executes the interrupted operation structure anew.

18. The method as claimed in claim 15, wherein responsive to the execution of the reaction structure reaction operation the manipulator further proceeds to operate from the rerun point.

* * * * *